US012368786B2

(12) United States Patent
Choi

(10) Patent No.: US 12,368,786 B2
(45) Date of Patent: Jul. 22, 2025

(54) DEVICE FOR IoT SERVICE

(71) Applicant: ELECTRONICS AND TELECOMMUNICATIONS RESEARCH INSTITUTE, Daejeon (KR)

(72) Inventor: Younghwan Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 77 days.

(21) Appl. No.: 18/539,539

(22) Filed: Dec. 14, 2023

(65) Prior Publication Data

US 2024/0214462 A1 Jun. 27, 2024

(30) Foreign Application Priority Data

Dec. 21, 2022 (KR) .................. 10-2022-0180442
Aug. 23, 2023 (KR) .................. 10-2023-0110495

(51) Int. Cl.
*H04L 67/53* (2022.01)
*H04L 67/10* (2022.01)
*H04L 67/50* (2022.01)

(52) U.S. Cl.
CPC ............ *H04L 67/535* (2022.05); *H04L 67/10* (2013.01)

(58) Field of Classification Search
None
See application file for complete search history.

(56) References Cited

U.S. PATENT DOCUMENTS

| | | | |
|---|---|---|---|
| 9,602,602 B2 | 3/2017 | Choi et al. | |
| 10,104,038 B2 | 10/2018 | Choi et al. | |
| 2020/0251213 A1* | 8/2020 | Tran | G06N 20/00 |
| 2021/0056141 A1 | 2/2021 | Wojcik | |
| 2021/0105435 A1* | 4/2021 | Ritchey | G06Q 10/067 |
| 2023/0052903 A1* | 2/2023 | Mazumder | G06Q 10/107 |
| 2023/0169118 A1* | 6/2023 | Aso | G06F 3/167 |
| | | | 707/766 |
| 2023/0396941 A1* | 12/2023 | Sturgeon | H04R 25/505 |

FOREIGN PATENT DOCUMENTS

KR 10-2020-0129625 A 11/2020

* cited by examiner

*Primary Examiner* — Quang N Nguyen

(57) ABSTRACT

Disclosed is a device for an Internet of Things (IoT) service. An edge network-based device group for an IoT service includes a terminal device configured to acquire user-related data related to a surrounding environment of a user and a lifestyle pattern of the user, a terminal management device configured to manage connectivity with the terminal device, receive the user-related data from the terminal device, preprocess the user-related data, and transmit control data generated based on the preprocessed user-related data to the terminal device, and a data management device configured to share the preprocessed user-related data with a data management device in a cloud-based device group by using a blockchain.

6 Claims, 3 Drawing Sheets

DEVICE FOR IoT SERVICE

CROSS-REFERENCE TO RELATED APPLICATIONS

This application claims the priority benefit of Korean Patent Application No. 10-2022-0180442 filed on Dec. 21, 2022, and Korean Patent Application No. 10-2023-0110495 filed on Aug. 23, 2023, in the Korean Intellectual Property Office, the disclosures of which are incorporated herein by reference for all purposes.

BACKGROUND

1. Field

One or more embodiments relate to a device for an Internet of Things (IoT) service.

2. Description of Related Art

Internet of Things (IoT) is a type of technology for connecting devices to objects through a network for data sharing and automation. With the growth of artificial intelligence (AI), the need for AI-based IoT technology has emerged.

The above description has been possessed or acquired by the inventor(s) in the course of conceiving the present disclosure and is not necessarily an art publicly known before the present application is filed.

SUMMARY

An aspect provides technology for an adaptive Internet of Things (IoT) service in response to a change in a surrounding environment of a user.

However, technical aspects are not limited to the foregoing aspect, and there may be other technical aspects.

According to an aspect, there is provided an edge network-based device group for an Internet of Things (IoT) service including a terminal device configured to acquire user-related data related to a surrounding environment of a user and a lifestyle pattern of the user. The edge network-based device group includes a terminal management device configured to manage connectivity with the terminal device, receive the user-related data from the terminal device, preprocess the user-related data, and transmit control data generated based on the preprocessed user-related data to the terminal device. The edge network-based device group includes a data management device configured to share the preprocessed user-related data with a data management device in a cloud-based device group by using a blockchain.

The terminal management device may provide an authentication functionality for security.

The terminal management device may manage performance of the terminal device by controlling traffic of the edge network.

The terminal management device may acquire service-related data for identifying the IoT service.

The terminal management device may preprocess the user-related data by filtering the user-related data.

The control data may be generated based on the preprocessed user-related data and the service-related data.

The data management device may share the preprocessed user-related data and the service-related data with the data management device in the cloud-based device group by using the blockchain.

According to an aspect, there is provided a cloud-based device group for an IoT service including a service management device configured to manage user-related data related to the surrounding environment of a user and a lifestyle pattern of the user and service-related data for identifying the IoT service and select data from the user-related data and the service-related data. The cloud-based device group includes a data processing device configured to generate control data related to an IoT service policy by using the selected data. The cloud-based device group includes a data management device configured to share the control data with a data management device in an edge network-based device group by using a blockchain.

The data processing device may generate the control data based on reinforcement learning using the selected data.

The control data may include data for controlling terminal devices in the edge network-based device group.

Additional aspects of example embodiments will be set forth in part in the description which follows and, in part, will be apparent from the description or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
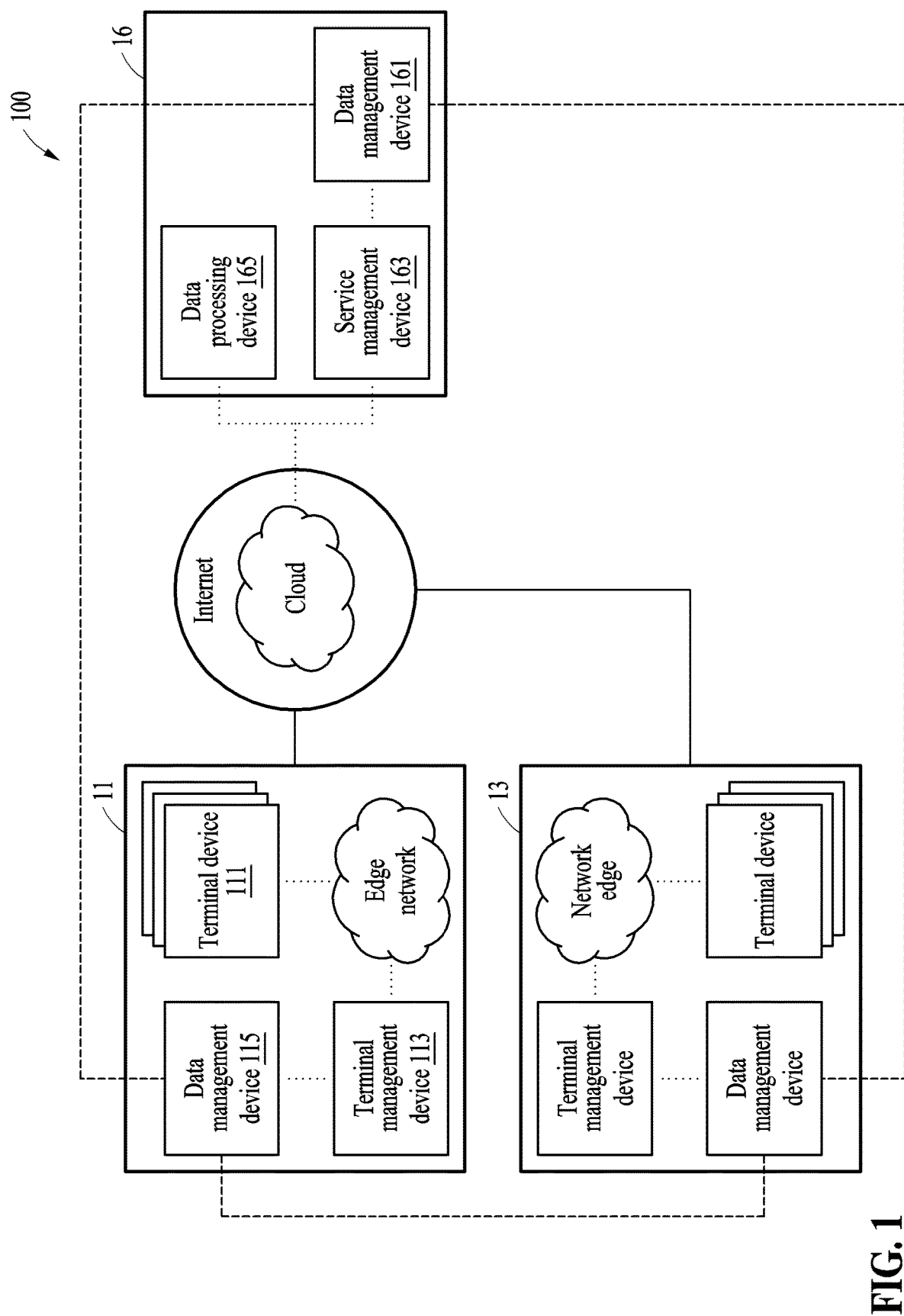
FIGS. 1 and 2 are diagrams illustrating devices for an Internet of Things (IoT) service according to an embodiment.

The following detailed structural or functional description is provided as an example only and various alterations and modifications may be made to the examples. Here, examples are not construed as limited to the disclosure and should be understood to include all changes, equivalents, and replacements within the idea and the technical scope of the disclosure.

Terms, such as first, second, and the like, may be used herein to describe various components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a," "an," and "the" are intended to include the plural forms as well, unless the context clearly indicates otherwise. As used herein, "A or B", "at least one of A and B", "at least one of A or B", "A, B or C", "at least one of A, B and C", and "at least one of A, B, or C," each of which may include any one of the items listed together in the corresponding one of the phrases, or all possible combinations thereof. It will be further understood that the terms "comprises/including" and/or "includes/including" when used herein, specify the presence of stated features, integers, operations, operations, elements, and/or components, but do not preclude the presence or addition of one or more other features, integers, operations, operations, elements, components and/or groups thereof.

Unless otherwise defined, all terms, including technical and scientific terms, used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used in connection with the present disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

The term "unit" or the like used herein may refer to a software or hardware component, such as a field-programmable gate array (FPGA) or an ASIC, and the "unit" performs predefined functions. However, "unit" is not limited to software or hardware. The "unit" may be configured to reside on an addressable storage medium or configured to operate one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operate on one or more central processing units (CPUs) within a device or a security multimedia card. In addition, "unit" may include one or more processors.

Hereinafter, embodiments will be described in detail with reference to the accompanying drawings. When describing the embodiments with reference to the accompanying drawings, like reference numerals refer to like elements and a repeated description related thereto will be omitted.

Figure 2:
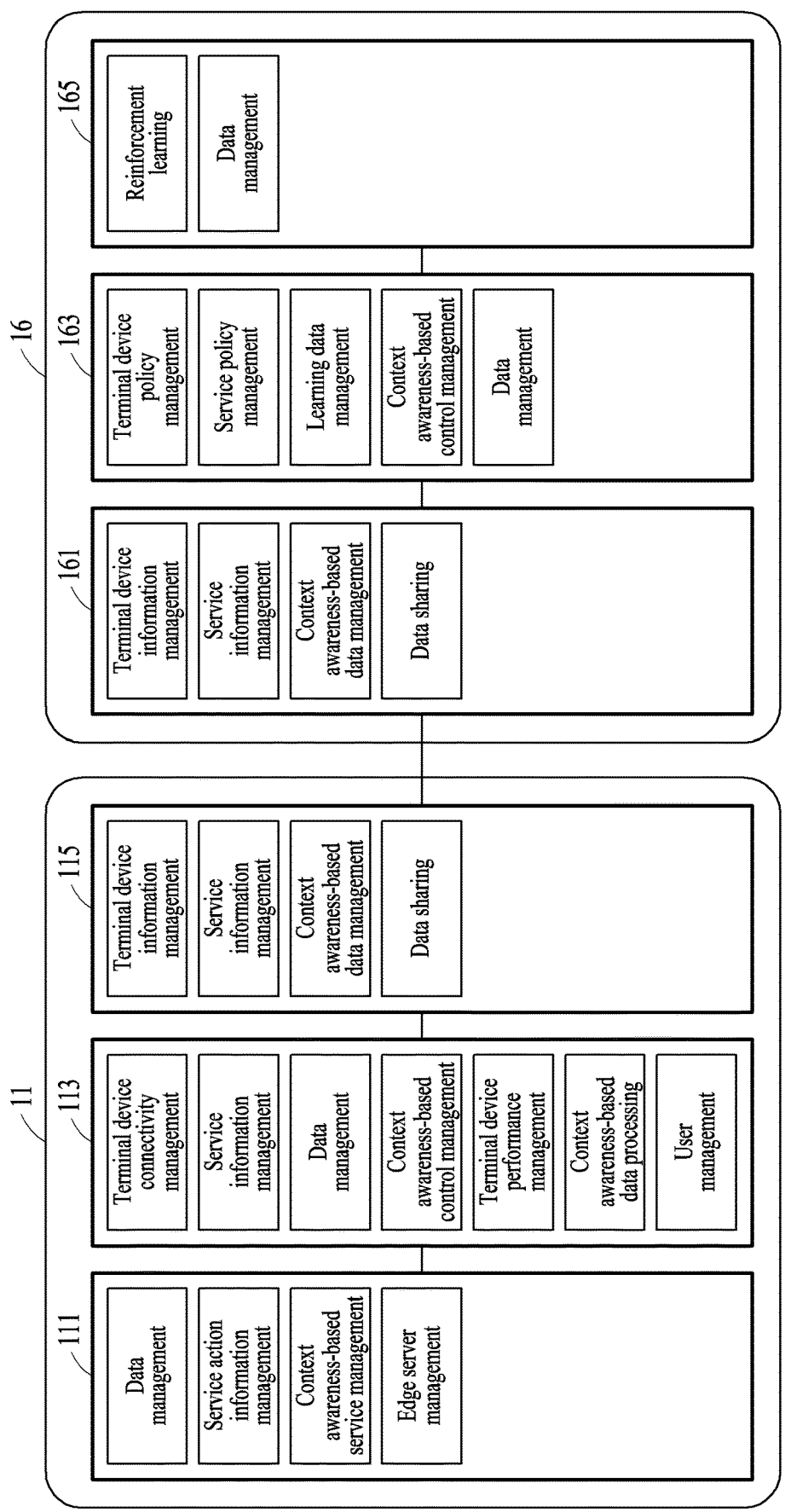

FIGS. 1 and 2 are diagrams illustrating devices for an Internet of Things (IoT) service according to an embodiment.

Referring to FIGS. 1 and 2, according to an embodiment, a framework 100 for an IoT service may include one or more edge network-based device groups 11 and 13 and a cloud-based device group 16. Hereinafter, for ease of description, the framework 100 including two edge network-based device groups 11 and 13 is provided as an example.

The edge network-based device group 11 may include a terminal device 111, a terminal management device 113, and a data management device 115.

The terminal device 111 may include all types of IoT devices (e.g., a sensor or an actuator) used for IoT services.

The terminal device 111 may provide a data management functionality. The terminal device may collect data related to IoT service requirements. For example, the terminal device 111 may acquire user-related information (or user-related data) (e.g., temperature, humidity, illuminance, fine dust, or energy usage) related to a surrounding environment of a user and a lifestyle pattern of the user. The terminal device 111 may acquire the user-related information in real time and/or at a predetermined time interval. The terminal device 111 may transmit the user-related information to the terminal management device 113.

The terminal device 111 may provide a service action information management functionality. The terminal device 111 may manage service action information (e.g., a switch control, audio information, or video information) necessary to provide an IoT service for the user. The terminal device 111 may acquire, store, search for, and/or update the service action information in real time and/or at a predetermined time interval.

The terminal device 111 may provide a context awareness-based service management functionality. The terminal device 111 may receive control information (or control data) from the terminal management device 113 and provide the user with an IoT service based on the control information. For example, the terminal device 111 may generate the service action information of the terminal device 111, based on the control information, and may operate based on the service action information. The control information may update information (e.g., the service action information) of the terminal device 111 and may include information for controlling an action state of the terminal device 111. The terminal device 111 may transmit data related to the current service action information of the terminal device 111 to the terminal management device 113.

The terminal device 111 may provide an edge server management functionality. The terminal device 111 may search for, register, and/or update information (e.g., a terminal management device identifier (ID)) of the terminal management device 113 which may be connected to the terminal device 111.

The terminal management device 113 may operate as a gateway of the terminal device 111.

The terminal management device 113 may provide a terminal device connectivity management functionality. The terminal management device 111 may search for, register, and/or update terminal device information (e.g., a terminal device ID or the service action information (or the action state)) of the terminal device 111.

The terminal management device 113 may provide a service information management functionality. The terminal management device 113 may search for, register, and/or update service-related information (or service-related data) on an IoT service desired by the user. For example, the terminal management device 113 may search for, register, and/or update the service-related information, such as a service ID, service requirements, and/or a connected device ID (e.g., a connected terminal device ID), in response to receiving an IoT service request from the user.

The terminal management device 113 may provide a data management functionality. The terminal management device 113 may acquire and/or store the terminal device information, the service-related information, and/or the user-related information.

The terminal management device 113 may provide a context awareness-based control management functionality. The terminal management device 113 may receive the control information from a service management device 163 included in the cloud-based device group 16 and may transmit the control information to the terminal device 111.

The terminal management device 113 may provide a terminal device performance management functionality. The terminal management device 113 may control a load of a storage device (e.g., the data management device 115) and/or traffic of a network (e.g., an edge network) and may maintain the performance of the terminal device 111.

The terminal management device 113 may provide a context awareness-based data processing functionality. The terminal management device 113 may process the user-related information. For example, the terminal management device 113 may perform preprocessing, such as filtering, buffering, and/or cumulative data generation. The terminal management device 113 may store the preprocessed user-related information in the data management device 115.

The terminal management device 113 may provide a user management functionality. The terminal management device 113 may search for, register, and/or update user information (e.g., a user ID or authentication information). The terminal management device 113 may enhance service security through the user management functionality.

The data management device 115 may be connected to the terminal management device 113. The data management device 115 may store pieces of data and share the stored pieces of data with a data management device in another edge network-based device group and/or a data management device 161 in the cloud-based device group 16 by using a blockchain.

The data management device 115 may provide a terminal device information management functionality. The data management device 115 may store the terminal device information (e.g., the terminal device ID or the service action information (or the action state)) of the terminal device 111. The data management device 115 may provide the user with a function for searching for the stored terminal device information.

The data management device 115 may provide a service information management functionality. The data management device 115 may store the service-related information (or the service-related data) on an IoT service desired by the user. The data management device 115 may provide the user with a function for searching for the stored service-related information.

The data management device 115 may share a data sharing function (e.g., the stored pieces of data including the terminal device information, the user-related information, and the service-related information) with the data management device in the other edge network-based device group and/or the data management device 161 in the cloud-based device group 16 by using a blockchain.

The cloud-based device group 16 may include the data management device 161, the service management device 163, and a data processing device 165. The data management device 161, the service management device 163, and the data processing device 165 may be implemented as separate devices or one device.

The service management device 163 may manage the terminal device information, the user-related information, and the service-related information. The service management device 163 may receive data (e.g., the terminal device information, the user-related information, and the service-related information) from the data management device 161 and may select data to be used for reinforcement learning from the received data. The service management device 163 may transmit the selected data to the data processing device 165.

The service management device 163 may provide a terminal device policy management functionality. The service management device 163 may generate data related to the service action information of the terminal device 111 in the edge network-based device group 11, based on the user-related data. For example, the service management device 163 may modify data on a change possibility of the service action information of the terminal device 111, based on a change of the user-related data. The service management device 163 may manage data (e.g., a terminal device policy, a terminal device policy ID, or the terminal device ID) related to the terminal device policy, based on the user-related data.

The service management device 163 may provide a service policy management functionality. The service management device 163 may modify the service-related data (e.g., the service requirements or the connected device ID) based on the user-related data. The service management device 163 may manage data (e.g., a service policy or a service policy ID) related to the service policy, based on the user-related data.

The service management device 163 may provide a learning data management functionality. The service management device 163 may generate learning data based on the data on the change possibility of the service action information of the terminal device 111. The service management device 163 may transmit the learning data to the data processing device 165. The service management device 163 may generate and/or modify the data related to the terminal device policy (e.g., the terminal device policy, the terminal device policy ID, or the terminal device ID) and/or the data (e.g., the service policy or the service policy ID) related to the service policy, based on the learning data.

The service management device 163 may provide a context awareness-based control management functionality. The service management device 163 may transmit the data related to the terminal device policy and the data related to the service policy to the terminal management device 115 in the edge network-based device group 11.

The service management device 163 may provide a data management functionality. The service management device 163 may perform data operations, such as data collection, data preprocessing, data analysis, data transmission, data storage, data synchronization, data query, data security, and data visualization, for an IoT service.

The data processing device 165 may receive data (e.g., the learning data) from the service management device 163 and may generate the control information (or the control data) of the terminal device 111 in the edge network-based device group 11 by using the received data. The data processing device 165 may generate the control information based on the reinforcement learning. For example, the data processing device 165 may predict the change of the service action information of the terminal device 111, based on collective intelligence and/or collaborative intelligence.

The data management device 165 may store the control information and may share the control information with the data management device 115 in the edge network-based device group 11. The functionalities provided by the data management device 165 may be substantially the same as the functionalities provided by the data management device 115 in the edge network-based device group 11. Accordingly, a repeated description thereof is omitted.

Figure 3:
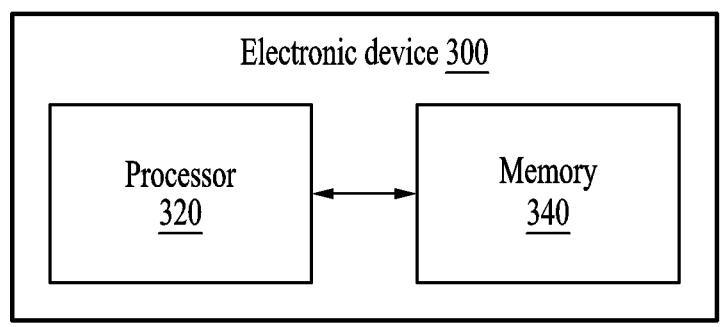
FIG. 3 is a block diagram illustrating an electronic device according to an embodiment.

FIG. 3 is a block diagram illustrating an electronic device according to an embodiment.

Referring to FIG. 3, according to an embodiment, an electronic device 300 (e.g., the terminal device 111, the terminal management device 113, the data management device 115, the data management device 161, the service management device 163, and the data processing device 165 of FIGS. 1 and 2) may include a memory 320 and a processor 340.

The memory 340 may store instructions (or programs) executable by the processor 320. For example, the instructions may include instructions for executing an operation of the processor 320 and/or an operation of each component of the processor 320.

The memory 340 may include one or more computer-readable storage media. The memory 340 may include non-volatile storage elements (e.g., a magnetic hard disk, an optical disc, a floppy disc, a flash memory, an electrically programmable memory (EPROM), and an electrically erasable and programmable memory (EEPROM)).

The memory 340 may be a non-transitory medium. The term "non-transitory" may indicate that a storage medium is not embodied in a carrier wave or a propagated signal. However, the term "non-transitory" should not be interpreted to mean that the memory 340 is non-movable.

The processor 320 may process data stored in the memory 340. The processor 320 may execute computer-readable code (e.g., software) stored in the memory 340 and instructions triggered by the processor 320.

The processor 320 may be a data processing device implemented by hardware including a circuit having a physical structure to perform desired operations. For example, the desired operations may include code or instructions included in a program.

For example, the hardware-implemented data processing device may include a microprocessor, a CPU, a processor core, a multi-core processor, a multiprocessor, an ASIC, and an FPGA.

An operation performed by the processor 320 may be substantially the same as the operation of the data processing device 160 described with reference to FIGS. 1 to 3. Accordingly, further description thereof is not repeated herein.

The examples described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, an FPGA, a programmable logic unit (PLU), a microprocessor, or any other device capable of responding to and executing instructions in a defined manner. The processing device may run an operating system (OS) and one or more software applications that run on the OS. The processing unit also may access, store, manipulate, process, and generate data in response to execution of the software. For the purpose of simplicity, the description of a processing unit is used as singular; however, one skilled in the art will appreciate that a processing unit may include multiple processing elements and multiple types of processing elements. For example, the processing unit may include a plurality of processors, or a single processor and a single controller. In addition, different processing configurations are possible, such as parallel processors.

The software may include a computer program, a piece of code, an instruction, or some combination thereof, to independently or collectively instruct or configure the processing unit to operate as desired. Software and data may be stored in any type of machine, component, physical or virtual equipment, or computer storage medium or device capable of providing instructions or data to or being interpreted by the processing unit. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs and/or DVDs; magneto-optical media such as optical discs; and hardware devices that are specially configured to store and perform program instructions, such as read-only memory (ROM), random-access memory (RAM), flash memory, and the like. Examples of program instructions include both machine code, such as produced by a compiler, and files containing higher-level code that may be executed by the computer using an interpreter.

The above-described devices may act as one or more software modules in order to perform the operations of the above-described examples, or vice versa.

As described above, although the examples have been described with reference to the limited drawings, a person skilled in the art may apply various technical modifications and variations based thereon. For example, suitable results may be achieved if the described techniques are performed in a different order, and/or if components in a described system, architecture, device, or circuit are combined in a different manner, or replaced or supplemented by other components or their equivalents.

Although the disclosure has been illustrated and explained with reference to various embodiments, it will be understood by those skilled in the art that the various embodiments are intended to be illustrative but not restrictive. It will be understood by those skilled in the art that various changes in forms and details may be made without departing from the true spirit and full scope of this disclosure including the scope of the attached claims and their equivalents. Also, it will be understood by those skilled in the art that any of the embodiments described herein may be used in conjunction with other embodiments described herein.

Therefore, other implementations, other examples, and equivalents to the claims are also within the scope of the following claims.

What is claimed is:

1. An edge network-based device group for an Internet of Things (IoT) service, the edge network-based device group comprising:
   a terminal device configured to acquire user-related data related to a surrounding environment of a user and a lifestyle pattern of the user;
   a terminal management device configured to manage connectivity with the terminal device, receive the user-related data from the terminal device, preprocess the user-related data, and transmit control data generated based on the preprocessed user-related data to the terminal device; and
   a data management device configured to share the preprocessed user-related data with a data management device in a cloud-based device group by using a blockchain;

wherein the terminal management device is further configured to acquire service-related data for identifying the IoT service;
wherein the control data is generated based on the preprocessed user-related data and the service-related data.

2. The edge network-based device group of claim 1, wherein the terminal management device is further configured to provide an authentication functionality for security.

3. The edge network-based device group of claim 1, wherein the terminal management device is further configured to manage performance of the terminal device by controlling a traffic of the edge network.

4. The edge network-based device group of claim 1, wherein the terminal management device is further configured to preprocess the user-related data by filtering the user-related data.

5. The edge network-based device group of claim 1, wherein the data management device is further configured to share the preprocessed user-related data and the service-related data with the data management device in the cloud-based device group by using the blockchain.

6. A cloud-based device group for an Internet of Things (IoT) service, the cloud-based device group comprising:
a service management device configured to manage user-related data related to a surrounding environment of a user and a lifestyle pattern of the user and service-related data for identifying the IoT service and select data from the user-related data and the service-related data;
a data processing device configured to generate control data related to an IoT service policy by using the selected data; and
a data management device configured to share the control data with a data management device in an edge network-based device group by using a blockchain;
wherein the data processing device is further configured to generate the control data based on reinforcement learning using the selected data;
wherein the control data comprises data for controlling terminal devices in the edge network-based device group.

* * * * *